United States Patent [19]

Kusunose et al.

[11] 3,936,394

[45] Feb. 3, 1976

[54] POLYMER ADSORBENTS AND METHOD FOR MANUFACTURE THEREOF

[75] Inventors: Tetsuhiro Kusunose; Tatsuo Ishikawa; Norio Akimoto; Noboru Fukuma; Kazuyoshi Imamura, all of Nobeoka, Japan

[73] Assignee: Asahi Kasei Kogyo Kabushiki Kaisha, Osaka, Japan

[22] Filed: Apr. 9, 1973

[21] Appl. No.: 349,464

[30] Foreign Application Priority Data

Apr. 13, 1972  Japan............................... 47-36422
Aug. 28, 1972  Japan............................... 47-85395
Sept. 12, 1972  Japan............................... 47-90974
Jan. 26, 1973  Japan............................... 48-10263

[52] U.S. Cl. ................ 252/430; 252/426; 252/428; 252/477 R
[51] Int. Cl.² ......................................... B01J 31/02
[58] Field of Search ......... 252/430, 426, 428, 477 R

[56] References Cited
UNITED STATES PATENTS

| | | | |
|---|---|---|---|
| 3,416,993 | 12/1968 | Heusser et al. ................ | 252/428 X |
| 3,442,819 | 5/1969 | Herbert............................ | 252/428 |
| 3,538,020 | 11/1970 | Heskett et al.................... | 252/428 X |
| 3,551,351 | 12/1970 | Murray et al. ................... | 252/426 X |
| 3,617,506 | 11/1971 | Cole et al. ....................... | 252/430 X |
| 3,682,594 | 8/1972 | Fish ................................. | 252/426 X |

*Primary Examiner*—Paul F. Shaver
*Attorney, Agent, or Firm*—Armstrong, Nikaido & Wegner

[57] ABSTRACT

The present invention is to provide a method of producing an adsorbent composed of micro-fibrils, comprising the steps of mixing two synthetic polymers in a mixing ratio of 20/80 – 80/20, both of said polymers being incompatible with each other when they are intimately mixed, subjecting the mixture in molten state to an extrusion molding to shape the article in the form of threads, ropes or films where at least one of the polymers assumes the forms of micro-fibrils, and thereafter treating the shaped article with a solvent which is incapable of dissolving or decomposing one polymer but capable of dissolving or decomposing the other constituent polymer.

The polymer adsorbent obtained by the above method is characterized by superior adsorbing activity and high treating efficiency and can be used for a wide range of purpose of adsorption.

16 Claims, 5 Drawing Figures

FIG. 2
INCOMPATABLE MIXTURE OF POLYETHYLENE TEREPHTHALATE CHIPS AND NYLON-6 POLYMER

FIG. 3

1000X  $\dfrac{1 cm}{1\mu}$

POLYMER ADSORBENTS AND METHOD FOR MANUFACTURE THEREOF

BACKGROUND OF THE INVENTION

Various kinds of adsorbents made of polymers inorganic substances (such as, for example, glass and diatomaceout earth) or metals in the form of powder, fiber, fabric, sintered mass, etc. have been suggested to date. Though these known adsorbents show excellent adsorbing ability in their specifiic field of application, they are not always satisfactory in terms of other properties required from the standpoint of commercial uses to which they are put. If a given adsorbent is comminuted for the purpose of improving its adsorbing effect, for example, the comminuted adsorbent causes clogging of a filter which is to be used in the subsequent treatment of filtration for the separation of adsorbent. Consequently, the adsorbent brings about of degradation of the treating speed and it tends to drift away in the form of aerosol or dust, rendering its handling difficult.

Ion-exchange resins are representative of polymer adsorbents and are widely utilized for industrial purposes. The salient disadvantage of ion-exchange resins is that their adsorbing activities are influenced by the electric charge and the size of substances to be adsorbed. Thus, they are deficient of universality over a complete range of conditions of use.

It is the use of porous polymer that one is quite readily conceived of with respect to polymer adsorbents or filters. There have been suggested various method for the manufacture of porous polymer substances such as by the incorporation of foaming agents, for example. In the case of a technique which relies for the formation of pores upon the use of such foaming agents, the control of pore sizes proves to be extremely difficult. Products made by this technique may satisfactorily be utilized as heat insulators, sound absorbers and other similar shock absorbers but have not yet been qualified for use as adsorbents or filters.

In recent years, membrane filters and other similar polymer membranes containing fine pores which are manufactured by effective use of special techniques have come to be utilized as filters for the separation of microscopic substances. These screen type filters have an advantage that the diameter of pores to be contained therein can be selected as desired and the filters are therefore capable of filtering substances of widely varying particle diameters. On the other hand a disadvantage is that substances having particle diameters smaller than the diameter of pores contained therein are passed completely. For example, a screen type filter is capable of removing a pigment, yeast, etc. dispersed in water but is ineffective for the removal of dye, chlorine and other molecules dissolved in aqueous solutions. Conventional adsorbents such as activated carbon and bone black are advantageously used for the adsorption of molecules dissolved in solutions but are least suitable for the adsorption of substances dispersed in liquids. That is to say, conventional filters have an exclusive function of effecting desired separation by filtration and conventional adsorbents have a sole function of providing desired separation by adsorption.

It is a primary object of this invention to provide novel polymer adsorbents excelling in adsorbing activity and enjoying high treating efficiency. It is another object of this invention to provide adsorbents possessed of adsorbing properties which make them suitable for a wide range of purpose of adsorption, i.e. adsorbents capable of adsorbing two or more different substances at the same time. It is still another object of this invention to provide adsorptive filters combining an adsorbing property and a filtering property.

SUMMARY OF THE INVENTION

The inventors pursued reserches with a view to accomplishing the objects mentioned above. Consequently, they have made a discovery that aggregate of micro-fibrils less than $10\mu$ in mean particle diameter which is obtained by molding an incompatible mixture of two polymers and thereafter removing from that mixture one of the two constituent substances by dissolution or decomposition exhibits an extremely high adsorbing ability with respect to various substances. The present invention has been accomplished on the basis of this discovery.

The polymer adsorbents according to the present invention are cabable of adsorbing a rich variety of substances as shown in Table 1.

Table 1

| Constituent material for adsorbent | Adsorbing activity |
|---|---|
| Polyamides | Oils and fats, gases, dyes, pigments, phenols, halogen molecules, microorganisms, yeasts, powdered adsorbents, etc. |
| Polyesters | Oils and fats, gases, dyes and powdered adsorbents. |
| Polyolefins | Oils and fats, gases and powdered adsorbents. |
| Polyvinyls | Oils and fats, gases and powdered adsorbents. |
| High molecular substance plus powdered adsorbent | Oils and fats, gases, dyes, pigments, organic substances, halogen molecules, metal ions, microorganisms, yeasts, etc. |

Polyamide adsorbents produced by the present invention, for example, can be used for the adsorption of various substances, including oils and fats, gases, dyes, pigments, phenols, halogen molecules, microorganisms and yeasts. The adsorbing activity of these adsorbents is the synergistic action of their high absorbing ability and the large surface area. The effect of adsorption derived from the adsorbents of the present invention is substantially equal to, or at times even superior to, the effect manifested by conventional adsorbents in the form of power, the form which has heretofore been generally accepted as being most effective for the purpose of adsorption. Further, the adsorbents of the present invention are entirely free from the drawbacks of the conventional adsorbents in the form of minute particles, namely clogging of filters during separation and drifting of fine particles during handling, etc.

As shown in Table 1, the adsorbents to be obtained by the present invention have been ascertained to have a capacity to adsorb and retain conventional powdered adsorbents such as, for example powdered activated carbon and nitrohumic acid. The adsorbents of the present invention which have such conventional powdered adsorbents carried thereon manifest adsorbing activities which surpass the additive effects of the constituent adsorbents involved, Thus, the range of adsorbing activities is further expanded by combination with such conventional powered adsorbents and the products of the combination can be utilized as universal adsorbents possessed of high adsorbing ability. These universal adsorbents are capable of separating two or more substances in one operation and, therefore are proved to be quite advantageous from the economic point of view.

The polymer adsorbents according to the present invention are made up of micro-fibrils. They can be shaped to desired forms so as to suit varying purposes of application. Particularly, since the adsorbents of this invention have a large surface area and their constituent micro-fibrils consequently manifest a strong interreacting capacity, they can be readily molded to the form of paper or laminate by the use of ordinary paper making technique. Since the constituent micro-fibrils have a mean diameter not larger than 10μ, the adsorbents can be molded in the form of laminates containing pores of the same order of diameter as screen type filters. These laminates can advantageously be utilized also as filters.

BRIEF DESCRIPTION OF THE DRAWING

The present invention will be described in more detail, taking into account of the drawings in which.

DETAILED DESCRIPTION

Figure 1:
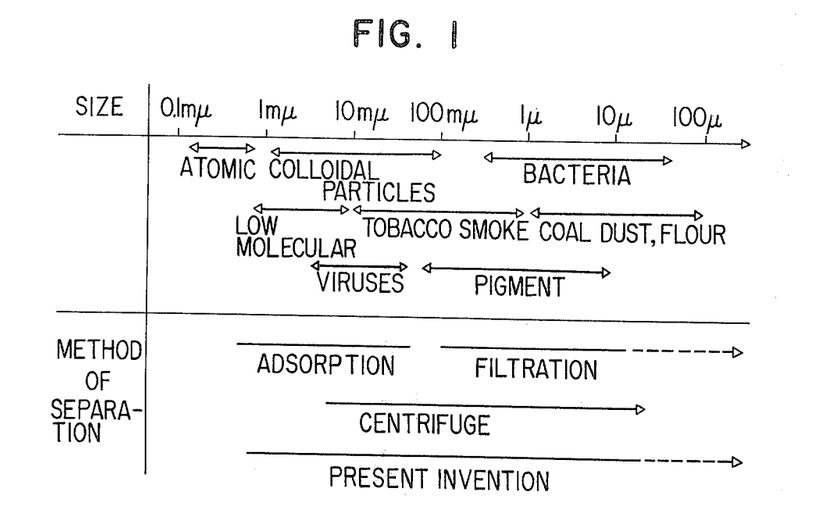
FIG. 1 is a diagrammatic representation of the relationship between the particle diameters of substances and the techniques available for the separation of such substances.

FIG. 1 shows the relationship between particle sizes of substances and methods resorted to for the separation of such substances. According to the conventional techniques for separation, substances to be separated are divided by their particle sizes into two groups, with the particle size of about 100mμ as the borderline. Substances with particles sizes smaller than 100mμ are separated by adsorption and those with particle sizes larger than 100mμ by filtration, as a general rule. The technique of centrifugation has been adopted for the separation of substances with particle diameters falling close to the borderline. It has heretofore been necessary to select a method of speparation on each occasion, by taking into account the particle size of a substance which is required to be separated. As described above, the adsorbents of the present invention can easily be shaped to the form of a laminate or filter. The adsorbents thus obtained can advantageously be utilized as adsorbent-filters combining the functions of adsorption and filtration. The adsorbents according to this invention, therefore, have an ability to separate substances of all particle sizes, ranging from molecules measuring several millimicrons in diameter to substances measuring several millimeters. Thus, the utility value of these adsorbents is literally remarkable.

As a result of research directed to the development of the aforementioned adsorbents or aggregates of micro-fibrils, the inventors have discovered that such aggregates of polymer micro-fibrils can easily be obtained by incompatibly mixing at least two polymers, molding the resultant incompatible mixture thereby allowing at least one of the constituent polymers to assume the form of micro-fibrils, and thereafter treating the mixture with a solvent which is incapable of dissolving or decomposing the polymer now in the form of micro-fibrils and capable of dissolving or decomposing the other polymer constituent. The method for the manufacture of adsorbents of this invention will be described fully herein below.

The two synthetic polymers which can serve as constituent elements for the adsorbent of this invention must satisfy the requirements that they are incompatible to each other, that they remain undissolved in each other to form a separate phase when they are mixed and molded under heat, and that at least one of the constituent substances assumes the form of micro-fibrils when the two or more constituent substances are mixed and molded under heat. For this reason, combinations of two polyamides (such as, for example, nylon 6 and nylon 66; nylon 6 and nylon 612), two polyesters, two polyolefins and so on are not suitable. Examples of combinations which may be used are two-constituent and three-constituent combinations between polyamides and polyesters, between polyamides and polyolefins, between polyvinyls, polyamides, polyesters and/or polyolefins.

The constituent substances mentioned above will be described more specifically. The term "polyamide type polyer" refers to polymer whose main chains are composed of amide links. Examples include nylon 6, nyon 66, nylon 610, nylon 12, nylon 612, 2-component or 3-component copolymers thereof, modified polyamides containing substitutents in side chains such as polyamides made to include tertiary amino groups in the structure thereof by the use of N,N'-dimethylethylenediamide and other similar N,N'-alkylated alkylenediamines as copolymerizable components thereof, amines containing sulfonate groups such as S-sulfoisophthalate group, and copolymerized polyamides containing the structure thereof sulfonate groups of dicarboxylic acids.

Polyester type polymer include polymers such as polyethylene terephthalates produced from terephthalic acid or esterification derivatives thereof and ethylene glycol and poly-p-ethylene-oxybenzoate derived from p-(β-oxyethoxy)-benzoic acid which are synthesized chiefly through the formation of ester links, though ether links and similar links other than ester links are present in the main chains thereof, block and random copolymerized polyesters thereof, and copolymers thereof with synthetic polymers other than polyesters, such as, for example, copolymers thereof with glycol, polyphenylene oxide and polybenzylbenzoyl.

The term "polyolefin type polymers" means polyethylene, polypropylene (PP) and the like. Examples of polyvinyl type high molecular substances are polystyrene, modified polystyrene, polyvinyl chloride, polyvinylidene chloride, polyvinyl acetate, polyacrylonitrile and polymethacrylate. The polymers to be used in the present invention have such a molecular weight (polymerization degree) that is enough to bring the form of minute fibrils. Their number average molecular weight is more than 10,000.

The combination of polymers constituents suitable for the purpose of this invention is to be selected suitably by taking into due consideration the kind of solvent or decomposing agent (referred to later) to be used and the type of use to which the produced adsorbent is put. For the adsorption of phenols or free halogen molecules, for example, use of an aggregate of polyamide micro-fibrils obtained by preparing an incompatible mixture of a polyamide and a polyester and removing the polyester constituent from that mixture proves to be advantageous. An aggregate of microfibrils obtained by removing from the said incompatible mixture either the polyamide constituent or polyester constituent can be satisfactorily utilized for the adsorption of oils and fats.

Figure 2:
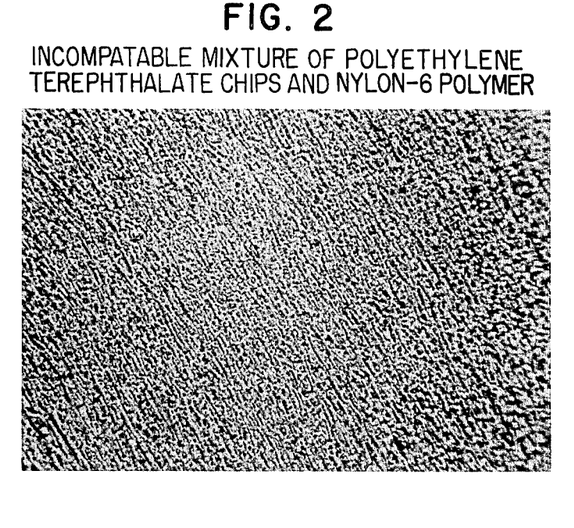
FIG. 2 is a phase-contrast photomicrograph (540 X magnification) of an incompatible mixture, wherein the white area represents a polyethylene terephthalate chip (PET) constituent and the colorless area nylon-6 (N-6) constituent respectively.

The inventors pursued a study on incompatible mixtures involving various combinations of constituent substances as mentioned above in an effort to investigate patterns of distribution of constituent substances in these mixtures. As a result, they have made a discovery that when an incompatible mixture is shaped so as to have at least one of the polymer constituents distributed in the form of micro-fibrils as illustrated in FIG. 2, the aggregate of micro-fibrils (adsorbent) to be obtained by a subsequent treatment with a solvent shows a markedly improved adsorbing ability. FIG. 2 is a phase-contrast photomicrogrpah illustrating the longitudinal cross-section along the drafted direction of an incompatible mixture. As will be described afterward, the said micro-fibrils are not always required to be arranged in good order in the direction of drafting. The pattern of distribution like the one shown in FIG. 2 is accomplished by proper selection of the mixing ratio of polymer constituents, method of mixture and method of molding.

No specific limits are imposed on the method of mixing polymer constituents. A mixing method is suitably selected from among ordinary methods such as, for example, melt-mixing method, blend-mixing method, latex-mixing method and solution-mixing method by taking into due consideration of the properties and shape of polymer constituents, miscibility between polymer constituents and so on. The melt-mixing method proves to be advantageous in the case of a mixture between two thermoplastic polymers and the blend-mixing method is found convenient for a mixture between two thermoplastic polymers with particularly low softening points.

The mixing ratio of the polymer constituents can be an important factor not only for the condition of distribution and mixture of constituent substances but also for the subsequent treatment, i.e., the isolation of the aggregate of micro-fibrils by the use of a solvent. Desirably the mixing ratio of the constituent substances is so fixed that the ratio accounted for by one constituent substance falls in the range of from 20 to 80% (by weight, the same hereinafter), preferably from 30 to 70%, based on the total weight of the mixture.

Generally in the mixture of two mutually incompatible polymers, the polymers are mixed and distributed in the form of fairly slender stripes by virtue of the shear stress exerted during the agitation of the mixture. An aggregate of micro-fibrils having a mean diameter of 0.01 to 10 $\mu$ like the one illustrated in FIG. 3 cannot be obtained solely by virtue of the shear stress of the agitation. To form such minute fibrils, the mixture must further be molded in a suitable form such as of threads, ropes or films and then it must be applied to an extrusion molding for further size reduction. When nylon 6 and polyethylene terephthalate are fused and mixed by means of a screw extruder, for example, it is desired that the mixture is extruded under pressure in the form of ropes and the ropes emanating from the extruder nozzle are taken up at a low draft ratio on the order of 10 times or below, for example. Here, the term "draft ratio" refers to the ratio of the take-up speed and the linear extrusion speed, and is defined by the following formula:

$$D = V/W/\rho \cdot S$$

in which $D$ is draft ratio, $W$: extrusion amount [ g/mm ], $\rho$: density [ g/cm$^3$ ] of polymer, $S$: area (cm$^2$) of the orifice of extruder nozzle and $V$: take-up speed (cm/min.). In this case, the mixture emerging in the form of ropes from the extruder nozzle need not be taken up at a higher draft ratio or subjected to drawing or streching simply for the purpose of reducing the diameter of the aggregate of the micro-fibrils to be obtained from the mixture through the subsequent treatment with a solvent. It should be noted that an aggregate of micro-fibrils to be obtained from highly stretched ropes provides a rather inferior adsorbing capacity.

In this respect, the process of the present invention is distinguished from U.S. Pat. No. 3,382,305 in which the mixed structure is drawn and stretched during the preparation of oriented microfibers, which are applied to different uses than those of present invention.

Figure 3:
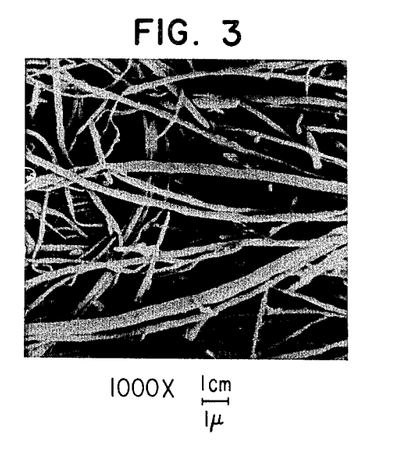
FIG. 3 is a scanning type electron photomicrograph, (1,000 X magnification) of an adsorbent of this invention prepared by treating the incompatible mixture of FIG. 2 with sodium hydroxide.

The experiments conducted by the inventors have ascertained that aggregates having constituent substances distributed and intertwined as illustrated in FIG. 3 can be sufficiently obtained by the application of the low draft ratio. The behaviors of the aggregates of minute fibrils to be obtained from these mixture through the subsequent treatment with a solvent also support the disirability of the sole utilization of the said shear stress.

The solvent or decomposing agent as referred to in this invention is a substance which is indispensable for the purpose of isolating from the mixture at least one of the form of micro-fibrils. It is also important that such solvent or decomposing agent should be incapable of dissolving or decomposing all the polymer constituents which compose the mixture. As a matter of course, a solvent or decomposing agent which satisfies the requirement is suitably selected, depending on the combination of polymer constituents which make up the mixture as well as the kind of the polymer desired to be isolated from the mixture. The polymer constituent substance to be isolated from the mixture should naturally be selected so that the finally produced aggregate of micro-fibrils will provide an adsorbing activity suited to the intended use.

In a mixture consisting of nylon 6 and polyethylene terephthalate at a weight ratio of 50:50, for example, the constituent polymers are mixed and intertwined in the form of micro-fibrils. Where an adsorbent composed of nylon 6 fibrils is desired, an aqueous solution of sodium hydroxide, an aqueous solution of potassium hydroxide or some other solution which can serve as the decomposing agent for polyethylene terephthalate can advantageously be used for the contemplated isolation. If an adsorbent composed of polyethlene terephthalate is desired, there is naturally employed formic acid, sulfuric acid, hydrochloric acid, trichloroacetic acid or some other compound which can serve as the solvent for nylon 6. Meta-cresol, ortho-chlorophenol and similar compounds are good solvents for both nylon 6 and polyethylene terephthalate and, therefore, prove to be unsuitable for the present case.

Examples of the combination of polymers and the suitable solvent or decomposer for removing one constituent polymer are as listed below.

| Combination of polymers | Solvent or Decomposer |
|---|---|
| PP / copolymerized nylon | formic acid: solvent for copolymerized nylon |
| Pst / PET | KOH: decomposer for PET |
| N-6/N-66/N-612/PET | NaOH:decomposer for PET |
| PE / PET | NaOH:decomposer for PET |
| PE / PET | O-Xylene: Solvent for PE |
| Pst / N-6 | Benzen, toluen: solvent for Pst |
| Pst / PET | " |
| Pst / PE | " |
| N-6 / PE | $H_2SO_4$.Trichloro acetic acid: solvent for N-6 |

Generally, polymers are dissolved in solvents or decomposed by decomposing agents extremely slowly as compared with low molecular substances. The dissolution or decomposition of one of the polymers constituents from the mixture takes a fairly long time. The time required for this treatment with the solvent may be shortened by a proper measure. Examples of measures available for this purpose are: (1) the incompatible mixture is so molded as to maximize the surface area of the mixture which is exposed to contact with the solvent; (2) the solvent or decomposing agent is used in a large excess; (3) the treatment with the solvent is carried out at an elevated temperature; and (4) the vessel used for treating the mixture with the solvent is provided with a suitable means designed to give necessary agitation to the mixture. An advantageous way for shortening the time required for the treatment with the solvent is to incorporate a foaming agent when the polymer constituents are mixed. The foaming agent thus incorporated not merely serves to render the constituent substances porous but homogenizes the mixture of the constituent substances by virtue of the phenomenon of foaming, with the result that the minute fibrils are intertwined more intimately. In the presence of such foaming agent, the minute fibrils are intertwined so as to embrace voids distributed throughout. In the subsequent treatment with the solvent, these voids provide an increased surface area for contact between the polymers constituents being dissolved and the solvent. Consequently, the time required for the treatment is reduced to a great extent. Ordinary foaming agents for use in thermo-plastic resins will do for this purpose. Examples are diazo compounds, diazocarboxylic acid compounds, aromatic sulfonyl-hydrazide compounds, azonitrile compounds, diazoamino compounds, inorganic carbonates, urea and thiourea type compounds. A foaming agent proper for the occasion should be suitably selected by taking into account the following factors: decomposition temperature of a foaming agent; melting point of constituent polymers; their mixing temperature or melting viscosity; and time for their mixing. Essentially, however, such a selection is determined in relation with a decomposing temperature and a melt-blending temperature of a foaming agent. The following table shows the decomposing temperatures of typical foaming agents.

| | Decomposing temperature (°C) | Blending temperature |
|---|---|---|
| Sodium hydrogencarbonate | 65 – 150 | about lower than 150°C |
| Diazoaminobenzene | 97 | |
| Azobis-iso-butyronitrile | 95 – 104 | |
| Benzensulfonhydrazide | 100 – 120 | about lower than 200°C |
| Ethyl diazoacetate | 130 – 135 | |
| Dinitrosopentamethylenetetramine | 206 | about lower than 250°C |
| Azodicarbonamide | 200 – 210 | |
| Azobisformamide | 240 | about lower than 300°C |
| Barium diazocarboxylate | 250 | |

Although the amount of foaming agent to be incorporated naturally varies with the foaming efficiency to be derived from the agent in use, it is generally selected in the range of from 0.1% to 5% by weight based on the combined weight of the polymers constituents. If the foaming agent is added in an amount exceeding the upper limit of 5%, the foaming occurs so vigorously as to induce breakage in the high molecular substances being incompatibly mixed. The final product to be obtained through the subsequent treatment with the solvent is somewhere near being powdery. This means that an adsorbent in the form of an aggregate of minute fibrils aimed at by the present invention cannot be obtained. It is suitable to incorporate a foaming agent before melt-blending with the other constituent. For example, it is preferably added and mixed as it is or in a form of solution when dry-mixing constituent chips.

In the case of an incompatible mixture of two or more polyamides with another polymer, incorporation of a polyamide forming substance proves to be effective for shortening the time required for the treatment with the solvent. In this case, an adsorbent formed of a copolymerized polyamide derived from the two polyamide constituents used at the beginning is obtained. The polyamide forming substance functions as the catalyst for amide-exchange reaction. Polyamide forming substance means nylon salt and lactams which are raw materials for polyamide. Such polyamide forming substance is capable of being high molecular polyamide when heated, and also of generating vapor at the time of polymerization. Nylon salt is what is made from fatty group, aromatic group, or from alicyclic dicarboxylic acid and fatty group, aromatic group or alicyclic diamine, and represented by the following general formula:

[$R_1$, $R_2$ indicate alkyl, allyl or cyclohexyl radicals of $C_nH_{2n}$ ($n \geq 2$)]

Further, lactams has amide bond in the structure of alicyclic compounds and is represented by the following general formula:

(R indicates alkyl radicals of $C_nH_{2n}$ (n $\geq$ 3))

Examples of the polyamide forming substance include hexamethylenediamine adipinate, hexamethylenediamine sebacanate, nylon salts such as salts of hexamethylenediamine and isophthalic acid or terephthalic acid, and lactams such as ε-caprolactam with high hygroscopicity, caplin lactam and lauryn lactam. Suitably, the amount of such hydrated polyamide forming substance to be added is selected from the range of from 0.1 to 10% by weight based on the polyamide.

The adsorbent of this invention which is obtained by treating the incompatible mixture with a solvent or decomposing agent is an aggregate having micro-fibrils 0.01 to 10 $\mu$ in mean diameter intertwined in an extremely complicated state as shown in FIG. 3.

The aggregates of minute fibrils according to the present invention enjoy unusually high adsorbing activity and a wide range of adsorbing properties as described in full depth in the preferred embodiments. As aggregate of minute polyamide fibrils to be obtained by forming an incompatible mixture of a polyamide and a polyester and subsequently removing from this mixture the polyester constituent not merely adsorbs phenols, pigments, sulfur-containing gases (such as SO and $SO_2$), oils and fats, free halogen molecules, etc., but also adsorbs micro-organisms such as colon bacilli and bacteria of genus Pseudomonas, yeasts, lactobacteria, and further selectively adsorbs micro-organisms from solutions containing such monocellular algae. Thus, the adsorbent exhibits its adsorbing activity with a wide range of substances.

The adsorbents of this invention show extremely high adsorbing activity compared with ordinary powdered polyamide adsorbents, as evidenced by the adsorption of phenols in Example 3 and by the adsorption of dyes in Example 3.

The aggregates of minute fibrils to be obtained by this invention are further capable of adsorbing and retaining ordinary powdered adsorbents such as, for example, powdered activated carbon and powdered diatomaceous earth. It is surprising to find that such aggregates of minute fibrils having conventional finely powdered adsorbents carried thereon exhibit an adsorbing capacity which exceeds the additive effect of the individual adsorbents present. An aggregate of minute nylon 6 fibrils and a powdered activated carbon having 100-Tyler mesh size have 12.0 mg/g and 30.0 mg/g of phenoladsorption capacity respectively. When the activated carbon is deposited 10% by weight, on the aggregate, the combined phenol-adsorption capacity increases to 64.5 mg/g. The simple additive effect of the aggregate of nylon 6 fibrils and the powdered activated carbon is found by calculation to be 13.8 mg/g (= 12 × 90/100 + 30 × 10/100). Actually, the capacity is 64.5 mg/g, a value more than four times as great.

Examples of the powders having of adsorbing properties are powdered inorganic adsorbents such as activated carbon, diatomaceous earth, bauxite, terra alba, various kinds of clay, bone char, alumina, magnesia, silica gel, activated silica, and nitrohumic acid and powdered organic adsorbents such as nylon powders, polypropylene powder and ion-exchange resin. The particle size of these powders is desired to be as fine as permissible, preferably to be smaller than 10-Tyler mesh. If the particle size is larger than 10-Tyler mesh, the aggregates of minute fibrils fail to provide sufficient adsorption of these powdered adsorbents, so that the powdered adsorbents cannot be carried uniformly on the aggregates. In addition, the combined adsorbing capacity exhibited against substances Being adsorbed amounts to a mere additive effect of the aggregate and the powdered adscrbent. Thus, the outstanding synergistic effect contemplated by this invention cannot be expected.

Various methods are available for providing a powdered adsorbent on an aggregate of minute fibrils of this invention. These are a dry method whereby the two adsorbents are mixed in their dry state so that the powdered adsorbent is directly adsorbed and carried on the surface of minute fibrils, a wet method whereby the powdered adsorbent is dispersed in water, an alcohol or some other suitable solution and the aggregate of minute fibrils is added to the solution and mixed by agitation so that the powdered adsorbent is adsorbed and carried on the surface of minute fibrils, and a method whereby the powdered adsorbent is incorporated in a sandwich construction in the course in which the aggregate of minute fibrils is shaped.

The mixing ratio between the aggregate of minute fibrils and the powdered adsorbent is an important factor not only in aconnection with the adsorption capacity and the adsorption efficiency but also from the standpoint of commercial utility. The mixing ratio may be varied with the purpose of use and the object of adsorption but it is an important factor which determines the conditions of shaping. It is suitable to fix the mixing ratio so that the ratio accounted for the powdered adsorbent falls in the range of from 5 to 500%, preferably from 5 to 300%, by weight based on the aggregate of minute fibrils. If the ratio is smaller than 5% or larger than 300%, the outstanding synergictic effect no longer can be observed. Particularly, if the ratio exceeds 500%, the powdered adsorbent causes clogging of the filter and degrades fitration efficiencies. The combination of the aggregate of minute fibrils and the powdered adsorbent in accordance with the present invention may suitably be selected by taking into due consideration of the purpose of use to which the combined product is put.

The adsorbing properties of the adsorbent to be obtained by this invention are advantageous over those of the conventional countertype in the following respects. Because of the combination of the aggregate of minute fibrils possessed of a wide range of adsorbing properties and the powdered adsorbent, a still wider range of adsorbing properties is enjoyed. For example, the adsorbing properties possessed by the aggregate of minute fibrils can be combined with the adsorbing properties of metal ions or with those of low molecular organic compound. Thus, the products of variable combinations can serve as general-purpose adsorbents. In other words, two or more substances can be adsorbed at the same time. A still greater advantage is that the adsorbing capacity of the combined product exceeds four times the simple additive adsorbing capacity of the aggregate of minute fibrils and the powdered adsorbent. In actual service, the synergized adsorbing capacity results in a marked reduction in the frequency with which the adsorbent is replaced with a new supply. Thus, the product proves to be highly advantageous also from the economic point of view.

The powdered adsorbent heretofore used can be carried on the aggregate of minute fibrils of this invention and utilized without having its adsorbing capacity degraded. If this product is molded to the form of sheet by a compression molder or granulated by a granulator, then the sheet adsorbent or granular adsorbent is free from difficulty of handling which has constituted one major drawback of conventional powdered adsorbent. With these adsorbents, the device to be used for the purpose of adsorption is simplified and the adsorbing effect and adsorption efficiencies are improved markedly.

Since the aggregate of micro-fibrils which is obtained by the present invention enjoys a large surface area and the individual fibrils show a very strong interaction, it can easily be shaped in the form of laminate (sheet) by the use of ordinary paper-making technique. A laminate adsorbent can be produced, for example, by uniformly spreading an aggregate of micro-fibrils in water and then suction filtering it on a metal gauze. The laminate adsorbent thus prepared can also be utilized advantageously as a filter. In the field of food processing industry, fermentation industry, phamaceutical industry and medical science, screen type microfilters are gaining in acceptance as an effective means for the separation of substances whose diameters are on the order of several microns or still smaller. These screen type filters have an advantage that the port size in filters can freely be selected and filters suitable for the separation of various substances can be produced by properly selecting the pore size. At the same time, they have a demerit that these filters permit complete passage of substances having diameters smaller than their pore sizes. Screen type filters can remove pigments, yeasts and the like which are dispersed in water. They are ineffective in the removal of dyes, chlorine and other molecules which are dissolved in aqueous solutions. By contrast, powdered adsorbents made of activated carbon, bone char and the like are advantageous for the adsorption of molecules which are dissolved in solutions but are unsuitable for the removal of substances which are dispersed in liquids. That is, conventional filters are effective only for filtration and conventional adsorbents are useful solely for adsorption. In the circumstances, development of an adsorbent which combines the adsorbing ability and filtering ability has been awaited.

Since the aggregate of micro-fibrils to be obtained by this invention can easily be shaped to the form of a laminate and its constituent fibrils have a mean diameter not larger than 10 $\mu$, it can be supplied as an adsorbent-filter having the same degree of filtering ability as that of a screen type filter. Such adsorbent-filter enjoys an increased range of utility.

The laminate adsorbent prepared in the manner described above from the aggregate of micro-fibrils of this invention can satisfactorily be utilized as an adsorbent-filter in its unmodified form. Structurally, the micro-fibrils in this laminate adsorbent are barely held together by virtue of their interaction. To withstand various physical forces such as fluid pressure and tensile stress which are exerted in the actual use, therefore, the laminate adsorbent must be improved in physical strength to some extent. When it is left immersed in liquids for a long time, the micro-fibrils which make up the laminate tend to come loose. The inventors continued a study in an effort to confer additional durability upon the laminate adsorbent so as to withstand fluid pressure, tensile stress and prolonged immersion in liquids without sacrificing the adsorbing and filtering abilities. Finally, they have discovered that the various defects mentioned above can be eliminated easily by using the laminate adsorbent in combination with a textile fabric possessed of good permeability to fluids. To be specific, this effective combination is accomplished by laminating at least one layer made of the aggregate of micro-fibrils on top of at least one layer of a textile fabric in the form of a stratified sheet.

Textile fabrics which are suitable for this purpose are woven fabrics, unwoven fabrics, knit fabrics and fabrics of similar constructions which are porous and permeable to fluids. Films and reticular articles are not included. Materials of which such textile fabrics are made are desired to possess satisfactory compatibility or adhesiveness with respect to the aggregate of micro-fibrils of which the laminate is formed. If the adsorbent happens to be an aggregate of polyamide type fibrils, it is proper to use textile fabrics made of polyamide type high molecular substances, high molecular substances possessed of peptide links such as wool and silk, and cellulose type high molecular substances such as cotton and rayon. Generally, use of textile fabrics which are made of the same polymer as the constituent substance of which the aggregate of micro-fibrils is formed proves to be most desirable.

In the formation of the stratified sheet from the aggregate of micro-fibrils and the textile fabric, use of any adhesive had better be avoided. If adhesive, if used at all, penetrates and fills up the voids which are formed within the laminate adsorbent and the textile fabrics and, consequently, offers an increased resistance to fluids in motion and degrades the treating speed. When the textile fabric to be used for this purpose is made of the same polymer as that of micro-fibrils in the laminate, the compatibility between the laminate and the fabric is so high that more compression can confer sufficient tenacity upon the combined product to withstand all physical forces involved in actual service. For the formation of the stratified sheet of the aggregate of micro-fibrils and the textile fabric, there may be employed any suitable method whereby the textile fabric is directly joined under pressure to the aggregate of micro-fibrils while the latter is being shaped in the form of a laminate. To be specific, one method comprises the steps of dispersing an aggregate of micro-fibrils in an aqueous solution, spreading a textile fabric on a metal gauze, casting the aqueous suspension of micro-fibrils onto the spread textile fabric, suction filtering the aqueous suspension through the fabric, layering another textile fabric thereon, pressing the resultant sheet and drying and another method involves the step of compressing a laminate of the aggregate of micro-fibrils and a textile fabric against each other in the atmosphere of steam. Use of these methods is advantageous. By the procedure described above, stratified sheets having thickness exceeding 0.1 mm, void ratio in the range of 30 to 80% and pore size in the range of 0.01 to 10 $\mu$ can freely be produced by selecting the molding conditions. They can be advantageously be utilized as adsorbent-filters.

As described above, the aggregate of micro-fibrils to be obtained by this invention can advantageously be used as an adsorbent because of high adsorpting activity coupled with adsorbing properties which are manifested on a rich variety of substances. It is also capable of adsorbing and retaining thereon a powdered adsorbent. The product obtained by having such a powdered adsorbent deposited on the aggregate of this invention exhibits adsorbing properties on still wider range of substances. Thus, this product can be used as an adsorbent for adsorbing a plurality of kinds of substances at the same time. The other product which is obtained by combining the aggregate of this invention with a textile fabric and which, therefore, enjoys both adsorbing ability and filtering ability can be effectively utilized as an adsorbent-filter.

The present invention will be described in further detail herein below with reference to preferred embodiments.

EXAMPLE 1

Mixed chips consisting of 50% by weight of nylon 6 chips (having a relative viscosity of 3.20 in 98% sulfuric acid solution at 25°C, hereinafter referred to as "N-6") and 50% by weight of polyethylene terephthalate chips (having an ultimate viscosity of 0.73 in O-chlorophenol at 35°C, hereinafter referred to "PET") were fed in a screw extruder (L/D=24) 45 mm in diameter, melt-mixed at screw rotation number of 60 r.p.m. and at 300°C and extruded in the form of ropes through an extruder nozzle containing two orifices 3 mm in diameter in an extrusion amount of 190 g/min and at orifice pressure of 20 kg/cm². The ropes of molten polymer emerging from the nozzle were sent through a cooling water bath, taken up at a rate of 20 m/min and chopped on a cutter into chips measuring 2.5mm in diameter and 4 mm in length. The longitudinal cross section of one of the chips was photographed through a phase-contrast microscope at 540 magnification. The photograph, shown as FIG. 2, reveals that N-6 and PET are incompatibly mixed in the form of alternately intertwined micro-fibrils. (In the photo, the colorless fibrils are those of N-6 constituent and the white fibrils those of PET constituent, respectively.)

The mixture chips were immersed and agitated for ten hours in 10% aqueous solution of sodium hydroxide 10 times as large in volume at 98°C, to eliminate completely PET constituent from the mixture. The N-6 polymer obtained after subsequent treatments of washing with water and drying was found to have a relative viscosity of 2.93 in 98% sulfuric acid solution at 25°C, an end amino group equivalent of 63 meq/kg and an end carboxyl group equivalent of 57 meq/kg. As shown by the scanning type electron photomicrograph, 1000X, of FIG. 3, this polymer is an aggregate of minute fibrils not more than 5 $\mu$ in diameter.

Separately, another portion of the mixture chips was immersed and agitated for six hours in 85% formic acid solution four times as large in volume at 65°C, to remove completely the N-6 constituent from the mixture. The PET polymer obtained after subsequent treatments of washing with water and drying was found to have an ultimate viscosity of 0.70 in O-chlorophenol at 35°C, an end carboxylic group equivalent of 41 meq/kg. It has the same construction as shown in FIG. 3.

EXAMPLE 2

This example is to show processes used for producing adsorbents of this invention comprising various polymers.

1. Mixed chips consisting of 60% by weight of polypropylene chips (having a melt index of 25 at 200°C, hereinafter referred to as "PP") and 40% by weight of copolymer chips (having a relative viscosity of 7.32 in 98% sulfuric acid solution at 25°C, hereinafter referred to as "Co. PA-1") made up of nylon 6 and nylon 66 at a weight ratio of 30:70 were fed into a screw extruder (L/D = 24) 45 mm in diameter, melt-mixed at screw rotation number of 55 r.p.m. and at 280°C and extruded in the form of ropes through an extruder nozzle containing two orifices in an extrusion amount of 120 g/min. and orifice pressure of 40 kg/cm². The ropes of molten mixture emerging from the nozzle was cooled in a water bath under a draft ratio of 1.5 and taken up at a rate of 20 m/min, and then chopped on a cutter into cylinders 2.0 mm in diameter and 5 mm in length. The mixture chips were immersed and agitated for six hours in 85% formic acid five times as large in volume at 70°C, to deprive the mixture completely of the Co.PA-1 constituent. Consequently, there was obtained an aggregate of micro-PP fibrils having the same construction as that shown in FIG. 3.

2. Mixed chips consisting of 30% by weight of polystyrene chips (having an ultimate viscosity of 0.0805 in benzene solution at 30°C, hereinafter referred to as "P-ST") and 70% by weight of PET chips (having an ultimate viscosity of 0.66 in O-chlorophenol at 35°C) were fed into a screw extruder (L/D=24) 45 mm in diameter, melt-mixed at a screw rotation number of 65 r.p.m. and at 290°C, and extruded in the form of tapes, in an extrusion amount of 260 g/min and orifice pressure of 5 kg/cm², in thickness through a slit-shaped extruder nozzle, which is 1.2mm wide and 40mm long, cooled in water and taken up, and then chopped on a cutter in the form of plate-shaped pellets. The mixture pellets were immersed and agitated for 12 hours in 10% aqueous solution of potassium hydroxide 10 times as great in volume at 98°C, to deprive the mixture completely of the PET constituent. The P-St constituent which survived the treatment with the solvent was obtained in the form of an aggregate of minute fibrils not larger than 10 $\mu$ in diameter.

3. The mixed chips of PP and copolymerized nylon made up of nylon 6 and nylon 66 at a weight ratio of 30/70 as described in (1) above had dinitrosopentamethylene tetramine incorporated therein a a foaming agent at a proportion of 0.2% by weight based on the total of high molecular constituents present. The resultant mixture was melt-mixed and shaped to produce cylinders of mixture polymer. These cylinders contained numerous pores about 0.1 mm in pore diameter in the interior. By following the procedure of (1) above, they were treated with formic acid to be deprived completely of the Co. PA-1 constituent. At the end of about 4 hours of immersion and agitation, there were obtained an aggregate of PP micro-fibrils. This clearly indicates that the time required for the treatment with the solvent can be shortened markedly.

Similar experiments were performed by using various amounts of the said foaming agent in an effort to shorten the time required for the treatment with the solvent. When the amount of the foaming agent exceeded 5.0% by weight, foaming occurred unusually vigorously at the extruder nozzle and breakage occurred heavily in the ropes of molten mixture emerging from the nozzle. When the broken ropes were treated for formic acid as the solvent, the Co. PA-1 constituent was dissolved out into the solvent after about two hours of treatment. The PP constituent which escaped dissolution by the solvent was a powdery mass, which was difficult to wash and separate.

4. Mixed chips consisting of N-6 chips (having a relative viscosity of 3.20 in 98% sulfuric acid solution at 25°C), N-66 chips (having relative viscosity of 2.57), N-612 chips (having a relative viscosity of 2.48), PET chips (having an ultimate viscosity of 0.73 in 0-chlorophenol at 35°C) and hexamethylenediamine adipinate at a weight ratio of 15/15/50/3 were fed into a screw extruder (L/D=24) 45 mm in diameter, melt-mixed at screw rotation number of 60 r.p.m. and at 300°C and extruded in the form of ropes in an extrusion amount of 160 g/min. and orifice pressure of 25 kg/cm², through an extruder nozzle containing two orifices 3 mm in diameter. The ropes of molten polymer emerging from the nozzle were taken up under a draft ratio of 1.2 and chopped on a cutter in the form of chips 2.5 mm in diameter and 4 mm in length. The mixture chips were immersed and agitated for five hours in 10% aqueous solution of sodium hydroxide five times as great in volume at 98°C. Consequently, there was obtained an aggregate of polyamide micro-fibrils. This aggregate was tested on a differential calorimeter to trace its caloric change. The test showed that a wide endothermic peak existed over the neighborhood of 176°C and of 208°C. This clearly represents the thermal behavior of the terpolymer polyamide of N-6/N-66/N-612. Mixed chips consisting of N-6 chips (having a relative viscosity of 3.20 in 98% sulfuric acid solution at 25°C), N-12 (having a relative viscosity of 1.80 as 0.5% solution in m-cresol at 30°C), PET (having an ultimate viscosity of 0.73 in 0-chlorophenol at 35°C) and ε-caprolactam (having a water content of 5% by weight) at a weight ratio of 20/30/50/3 were melt-mixed and shaped under the same conditions as mentioned above and subsequently treated with an alkali under the same conditions as above. Consequently, there was obtained an aggregate of polyamide micro-fibrils.

This aggregate was tested on a differential calorimeter to trace its caloric change. The test showed that the emdothermic peak over 215° – 220°C corresponding to the melting point of N-6 was not present and that a wide endothermic peak over 145° – 165°C corresponding to the melting point of the copolymerized polyamide of N-6 and N-12 was present. This shows that when a polyamide-forming substance is added in the preparation of an incompatible mixture of two or more polyamides and other kind of high molecular substance as in the present case, the constituent polyamides are copolymerized within the incompatible mixture to produce an adsorbent of a copolymerized polyamide quite readily.

EXAMPLE 3

Figure 4:
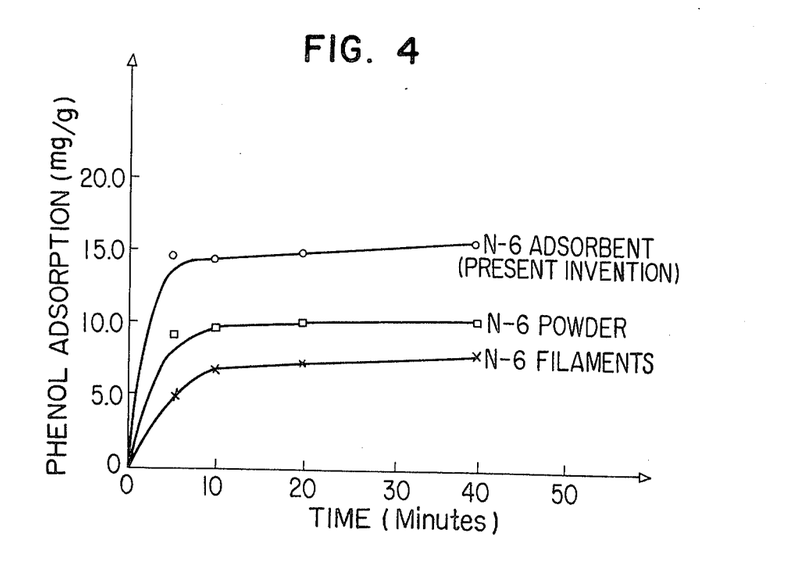
FIG. 4 shows the time-course changes of phenol adsorption by N-6 adsorbent (curve with "o" marks), N-6 power (curve with "☐" marks) and N-6 filaments (curve with "x" marks)

An aggregate of N-6 micro-fibrils (adsorbent of this invention) obtained by repeating the procedure of Example 1, N-6 powder (having a mean particle diameter of 50 μ) and N-6 multifilaments (70 d/24 f) were taken, 2 g each, in 300-cc flasks fitted with a ground stopper and were held under 200-cc of the standard aqueous solution of phenol (1 g/liter) for 5, 10, 20 and 40 minutes, and thereafter separated by filtration. The filtrates thus obtained were assayed for phenol residues by the potassium bromate-potassium bromide solution process to determine the amounts of phenol adsorbed. The results are shown in FIG. 4. From the graph, it is seen that the adsorbent of this invention is incomparably superior in phenol-adsorption efficiencies, i.e. adsorption speed and equilibrium adsorption amount, to the N-6 powder and the N-6 filaments.

The adsorbent of this invention and N-6 powder were further tested for their utility value as adsorbent-filter. This test consisted of filling No. 1 glass filter 25 mm in radius with 5 g of each adsorbent, connecting the glass filter to a suction bottle, and suction filtered a given substance by means of an aspirator. In this case, 1 liter of the standard aqueous solution of phenol mentioned above was used. In the test, the time required for 1 liter of the solution to be filtered and the amount of phenol adsorbed out of the solution were measured. The results are shown in Table 2.

Table 2

|  | Degree of suction (mmHg) | Time for filtration | Amount of phenol adsorbed |
|---|---|---|---|
| Product of this invention | 160 mmHg | 44 sec. | 503.8 mg |
|  | 500 | 1 min 39 sec. | 483.7 |
| N-6 powder | 160 | 37 min 45 sec. | 511.6 |
|  | 500 | 146 min | 416.2 |

From this table, it is seen that the amount of phenol adsorbed was hardly different between the product of this invention and the N-6 powder where the suction filtration was made under the same degree of suction, whereas the time required for filtration was decidedly shorter for the product of this invention than for the N-6 powder. Again, this test proves that the product of this invention has extremely high utility value as an adsorbent having improved treating efficiencies.

EXAMPLE 4

Aggregates of N-6 fibrils and those of PET fibrils obtained by repeating the procedure of Example 1 were tested for dye-adsorbing properties. The dyes used in this test were acid dye (Coomassie ultra sky SE150), direct dye (Japanol Brilliant Blue 6BKX), disperse dye (Solar Orange 2) and basic dye (Cathilon Blue). The adsorbents, 1 g each, were immersed in 50-cc dye solutions (0.5 g/liter), left to stand at normal room temperature (about 25°C) for 10 minutes and 60 minutes and then separated by filtration. The filtrates were assayed for dye residues by colorimetry to determine amounts of dyes adsorbed. The results are given in Table 3. The same test was also conducted on N-6 filaments (70 d/24 f) and PET filaments (140 d/17 f) for the purpose of comparison. From the table, it is clearly seen that the product of this invention exhibits satisfactory adsorbing property even at normal room temperatures and that it has decidedly higher adsorbing activity than the multifilaments.

Separately, mixed chips consisting of 50% by weight of a copolymerized polyamide (having a relative viscosity of 2.48 in 98% sulfuric acid solution at 25°C) made up of hexamethylenediamine adipinate and potassium sulfonic acid-3,5-carboxybenzene hexamethylenediamine (0.5 mol% based on hexamethylenediamine adipinate) and 50% by weight of PET were treated by following the procedure of Example 1 to produce an aggregate of copolymerized polyamide micro-fibrils. This aggregate was found to adsorb basic dyes effectively at normal room temperatures. The preceding description leads to a conclusion that all kinds of dyes can be adsorbed by the products of this invention provided that the constituent substances are properly selected. Substances adsorbed on the products of this invention can be desorbed by proper treatments. In the case of an acid dye, treatment with 5% aqueous solution of sodium hydroxide provides desired adsorption of the dye. This treatment permits recovery of the dye and at the same time enables the adsorbent to be put to service again.

Table 3

| Adsorbent of this invention | Dye Time | Direct dye 10 min. | Direct dye 60 min. | Acid dye 10 | Acid dye 60 | Disperse dye 10 | Disperse dye 60 | Basic dye 10 |
|---|---|---|---|---|---|---|---|---|
| N-6 adsorbent | | 51% | 85 | 2.0 | 15.0 | 49 | 83 | — |
| N-6 multifilaments | | 12 | 46 | 0.08 | 1.18 | 15 | 53 | — |
| PET adsorbent | | — | — | — | — | 0.5 | 0.7 | — |
| PET multifilaments | | — | — | — | — | 0 | 0 | — |
| Copolymerized polyamide adsorbent | | 53 | 88 | 1.2 | 8.7 | 43 | 85 | 7 |

EXAMPLE 5

N-6, PET, PP and PSt adsorbents obtained by repeating the procedure of Example 1 and Example 2 were packed, 15 g each, in U-shaped tubes 150 mm in height. In the meantime, $H_2S$ gas and $SO_2+SO$ gas were generated by ordinary methods and diluted each with $N_2$ gas to a concentration of 1,000 ppm. The diluted gases were passed through the U-shaped tubes packed with the said adsorbents to measure amounts of gases to be adsorbed. The same test was also conducted by using a commercially available, finely divided activated carbon (about 50 Tyler mesh) for the purpose of comparison. The results are shown in Table 4. From the table, it is seen that the adsorbents provide nearly the same adsorbing properties on these gases as activated carbon.

The method employed for the analysis of gas was methylene blue colorimetry for $H_2S$ gas and autoanalyzer process for $SO_2$ and SO.

Table 4

| | $H_2S$ | $SO+SO_2$ |
|---|---|---|
| N-6 absorbent | 90% | 100% |
| PET | 85 | 100 |
| PP | 85 | 100 |
| P-St | 88 | 100 |
| available activated carbon | 95 | 100 |

EXAMPLE 6

An adsorbent of copolymerized nylon prepared by following the procedure of Example 2 (4), unwoven fabric of N-6 and woven fabric of 70 d/24 f N-6 filaments were tested for property of adsorbing colon bacilli. The test consisted of the steps of packing 5 g of adsorbent in No. 1 glass filter 25 mm in radius, connecting the filter to a suction bottle and suction filtering the aqueous solution of colon bacilli 6,800/cm³ (by pure culture) under reduced pressure of 200 mmHg with the aid of an aspirator. The filtrates were examined to obtain counts of bacilli. The results are shown in Table 5. From this table, it is evident that the unwoven fabric and the woven fabric provide practically no adsorption-filtration of colon bacilli, whereas the adsorbent of this invention provides perfect filtration of the bacilli.

Table 5

| | Count of baccilli |
|---|---|
| Before filtration | 6,800/cc |
| Filtrate from the product of this invention | 0 |
| Filtrate from the unwoven fabric | 6,300 |
| Filtrate from the woven fabric | 6,700 |

The same adsorbent of this invention was packed, 5 g, in the glass filter. When the aqueous solution containing L-glutamin fermenting cells at a concentration of 4,000 ppm was passed through this tube, the cell concentration in the filtrate fell to below 10 ppm. This shows that the said adsorbent can be utilized for simple yet effective separation of cells compared with the conventional coagulation-sedimentation process.

EXAMPLE 7

Heavy oil was poured dropwise into a water bath 10 cm in depth and 10,000 cm² in water area until it formed a film about 1.5 mm in thickness on the water. The N-6, PET, PP and P-St adsorbents obtained by following the procedures of Example 1 and Example 2 were plunged, 10 g each, into the water bath and left to stand therein for four minutes. At the end of the standing, they were removed from the water bath and examined for amounts of oil adsorbed. The results are shown in Table 5. The same test was also conducted on 10 g each of multifilaments, 70 g/24 f.

As is clear from the table, the adsorbents obtained by this invention adsorb the oil more than five times as much as the multifilaments. Thus, they serve as excellent adsorbents for oils and fats.

Table 6

| polymers | adsorbent | Amount of heavy oil adsorbed (mg/g) |
|---|---|---|
| N-6 | product of this invention | 3080 |
| | Multifilaments | 460 |
| PET | Product of this invention | 2850 |
| | Multifilament | 430 |
| PP | Product of this invention | 3500 |
| | Multifilament | 600 |
| P-St | Product of this invention | 3360 |
| | Multifilament | 560 |

EXAMPLE 8

Powdered activated carbon (100 Tyler mesh), 10 g, was dispersed by agitation in 1 liter of water. An aggregate of micro-N-6 fibrils obtained by the procedure of Example 1, 90 g, was added to the water, agitated, separated by filtration and dried. Consequently, the powdered activated carbon was adsorbed and carried completely on the aggregate. The aggregate now having the activated carbon carried thereon, 2 g, was placed in a 300-cc flask fitted with a ground stopper. To the flask, 200 ml of the standard phenol solution (1 g/liter) was added. The aggregate was left to stand under the solution for 20 minutes and then separated by filtration. The filtrate was tested for phenol residue and the amount of phenol adsorbed was calculated. In the same manner, powdered diatomaceous earth (80

Tyler mesh) and powdered activated terra alba (100 Tyler mesh) were deposited, 10 g each, on aggregates of microN-6 fibrils. They were similarly tested for phenol-adsorbing capacity. The results are shown in Table 7. The term "simple additive amount of adsorption" refers to the amounts of phenol which the N-6 adsorbent and the powdered adsorbent are assumed to adsorb independently of each other. From the table, it is noted that the product obtained by having the powdered adsorbent carried in the N-6 adsorbent provides more than four times as high adsorbing capacity as the siimple additive amount of adsorption.

In the case of a product having a powdered adsorbent carried on the N-6 adsorbent, the powdered adsorbent remained unscattered and was easy of handling.

Table 7

| Adsorbent | Amount of phenol adsorbed (mg/g) |
| --- | --- |
| N-6 absorbent | 12.0 |
| Powdered activated carbon | 30.0 |
| N-6 adsorbent having activated carbon carried | 64.5 |
| Simple additive amount of adsorption | 13.8 |
| Powdered diatomaceous earth | 16.5 |
| N-6 adsorbent having diatomaceous earth carried | 43.2 |
| Simple additive amount of adsorption | 11.5 |
| Powdered activated terra alba | 22.7 |
| N-6 adsorbent having activated terra alba carried | 56.8 |
| Simple additive amount of adsorption | 13.1 |

EXAMPLE 9

On aggregates of PP micro-fibrils obtained by following the procedure of Example 2 (1), powdered activated carbon of 100 Tyler mesh and nitrohumic acid of 120 mesh were deposited, each by 20% by weight, in the same way as described in Example 8. By using a compression molder, 10 g each of the deposited products was shaped in the form of a plate 5 mm in thickness. The plate adsorbent was held fast on No. 1 glass filter and 100 g of a mixture consisting of 5% by weight of a long-used vacuum pump oil (containing 0.05% by weight of iron) and 95% by weight of 0.5% aqueous solution of copper sulfate (about 2,000 ppm of $Cu^{++}$) was passed. Analysis of the filtrates showed that, in both plates, the iron content fell below 20 ppm and the oil content to 300 ppm. The $Cu^{++}$ ion residue was 1,650 ppm for the adsorbent containing the activated carbon and 1,480 ppm for the adsorbent containing nitrohumic acid. From this example, it is evident that the products of this invention obtained by having conventional powdered adsorbents carried on polymer aggregates are capable of adsorbing two or more substances at the same time.

EXAMPLE 10

A stratified article was produced from an aggregate of PP micro-fibrils obtained by the procedure of Example 2 (1) and an unwoven fabric of PP and it was tested for adsorptionfiltration property. In a household supermixer (made by Tokyo Shibaura Electric Co., Ltd.), 15 g of PP aggregate and 1 liter of water were agitated for one minute. The unwoven fabric of PP was spread on a metal gauze 100 Tyler mesh placed on the bottom of a box-shaped filter (200 mm in width, 250 mm in length and 200 mm in height). The said mixture was poured onto this unwoven fabric, suction filtered through metal gauze and overlaid by another unwoven fabric of PP. Thus, the stratified article was produced. After the water wetting the article was allowed to run off, the stratified article was peeled off the metal gauze and then shaped in a hydraulic press at 70°C under 10 Kg weight/cm². A laminated article composed solely of PP aggregate was similarly molded for the purpose of comparison. The properties of the two articles are shown in Table 8.

Table 8

| | Thickness (mm) | Porosity (%) | Pore size ($\mu$) | Tensile strength (Kg/g) | Filtering speed (ml/cm²/min.) |
| --- | --- | --- | --- | --- | --- |
| Stratified article | 1.86 | 72 | 1.3 | 9.6 | 6.4 |
| Laminated article | 1.40 | 72 | 1.4 | 1.3 | 6.6 |

Porosity (%) = $\{1 - P_a/P_t\} \times 100$
where, $P_a$: apparent specific gravity of stratified article and $P_t$: true specific gravity of PP
Pore size: Calculated in accordance with Hagen-poseuille's formula shown below.
$$r = \sqrt{\frac{d \times v}{porosity}}$$
where, $r$: pore diameter ($\mu$), $d$: thickness (mm) of stratified article and $v$: filtering speed (ml/cm²/min.), calculated in volume passed per unit time across unit area under reduced pressure of 0.14 atm.
Tensile strength (kg G): A specimen 10 mm in width and 100 mm in length was fixed at one end, with a load attached to the other end. The tensile strength was measured as magnitude (in kg) of load at which the specimen broke within five seconds of load application.

From Table 8, it is found that the stratified article made up of the aggregate of micro-fibrils and the unwoven fabric shows substantially no difference in porosity, pore diameter and filtering speed from the laminated article made up solely of the aggregate and excels in tensile strength conspicuously.

By way of testing the adsorption-filtration property, an aqueous solution of styrene-butadiene rubber latex (having a mean particle diameter of 0.2 $\mu$) containing 2% of kerosene was suction filtered through the stratified article prepared in this case under reduced pressure of 0.14 atm. The kerosene was adsorbed on the inside of the stratified article and the SBR latex was adsorbed and separated from the solution by the article. The filtrate was a clear water. This stratified article combined both adsorbing ability and filtering ability and showed excellent physical strength.

EXAMPLE 11

After the manner of Example 8, powdered activated carbon (100 Tyler mesh) was deposited at various ratios on aggregates of N-6 micro-fibrils obtained by the procedure of Example 1. The products were placed, 1 g each, in 300-cc flasks fitted with a ground stopper. To the flasks, 100 cc each of an aqueous solution of chlorine (0.5 g/liter) was added so that the specimens were left to stand under the solution for five minutes. At the end of the standing, the specimens were separated by filtration. The filtrates were subjected to colorimetry by the ortho-toluydiene method to determine chlorine residues. Thus, the amounts of chlorine adsorbed by the products were calculated.

Figure 5:
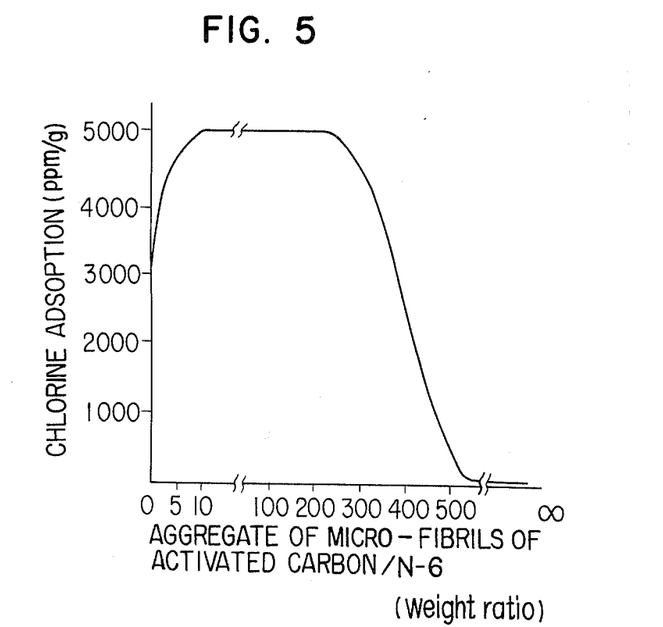
FIG. 5 shows the change in chlorine adsorption (ppm/g) as a function of the weight ratio of activated carbon and aggregate of N-6 fibrils.

FIG. 5 graphically shows the equilibrium adsorption of chlorine as the function of the mixing ratio of the aggregate of N-6 fibrils and the activated carbon.

The aggregate of N-6 fibrils according to this invention shows a chlorine adsorption of about 3000 ppm.

This means that the aggregate by itself is an excellent adsorbent for chlorine.

The powdered activated carbon, if used alone, shows a chlorine adsorption of only less than 100 ppm. The chlorine adsorption decreases sharply when the weight ratio accounted for by the powdered activated carbon exceeds 400%. The effect of chlorine adsorption is synergized remarkably when the weight ratio falls in the range of from 5 to 300%.

What we claim is:

1. A method of producing an adsorbent composed of microfibrils, comprising the steps of
   a. mixing two synthetic polymer components A and B in a mixing ratio of 20/80 – 80/20, both of said polymer components having a number average molecular weight of at least 10,000 and being incompatible with each other when they are intimately mixed such that they remain undissolved in each other to form a separate phase when they are mixed and molded under heat,
   b. subjecting the mixture in molten state to an extrusion molding to shape the article in the form of threads, ropes or films where polymer A forms microfibrils, said molding being done at a draft ratio of 1.0 – 10.0 and thereafter,
   c. treating the shaped article with a solvent which is incapable of dissolving or decomposing the polymer A but capable of dissolving or decomposing the other constituent polymer B.

2. A method according to claim 1, wherein polymer A is at least one selected from the group consisting of polyamides, polyesters, polyolefins and polyvinyls, the other constituent polymer B is at least one selected from the group consisting of polyamides, polyesters, polyolefins and polyvinyls, the polymers being selected so that selected polymer A is incompatible with selected polymer B.

3. A method according to claim 1, wherein polymer A consistes of at least one polyamide, the other constituent polymer B being at least one selected from the group consisting of polyesters, polyolefins and polyvinyls.

4. A method according to claim 1, wherein polymer A is at least one polyester, the other constituent polymer B being at least one selected from the group consisting of polyvinyls, polyamides and polyolefins.

5. A method according to claim 1, wherein said polymer A is at least one polyolefin, the other constituent B being selected from the group consisting of polyamides, polyesters and polyvinyls.

6. A method according to claim 1, wherein polymer A is at least one polyvinyl, the other constituent polymer B being at least one selected from the group consisting of polyamides, polyesters and polyolefins.

7. A method according to claim 1, wherein the mixing ratio of polymers A and B is 30/70 to 70/30.

8. A method of producing an adsorbent composed of microfibrils according to claim 1, in which a foaming agent is added at the time of mixing polymers A and B, said foaming agent being selected from the group consisting of diazo compounds, diazo-carboxylic acid compounds, aromatic sulfonylhydrazide compounds, azonitrile compounds, diazoamino compounds, inorganic carbonates, urea and thiourea type compounds.

9. A method of producing an adsorbent composed of microfibrils according to claim 1, wherein a substance selected from nylon salts and $\epsilon$-lactams is added to the mixture, when polymer A is a polyamide.

10. An adsorbent obtained by the method according to claim 1.

11. A method of producinng an adsorption-filter, comprising laminating the adsorbent obtained by the method according to claim 1 into a stratified form.

12. A method of producing an adsorption-filter, wherein at least one layer of the adsorption-filter obtained by the method according to claim 11 is combined with at least one layer of fabric.

13. An adsorption-filter obtained by the method according to claim 12.

14. An adsorbent according to claim 1, wherein, on said adsorbent composed of micro-fibrils, at least one kind of powdered adsorbent selected from the group consisting of activated carbon, diatomaceus earth, bauxite, terra alba, bone char, almina, magnesia, silica gel, activated silica, nitrohumic acid and allophane is carried.

15. An adsorbent according to claim 14, wherein said powdered adsorbent is a powder of activated carbon, 5 to 500 weight percent of said activated carbon is carried on said adsorbent composed of micro-fibrils.

16. An absorbent according to claim 14, wherein said powdered adsorbent is a nitrohumic acid, 5 to 500 weight percent of said nitrohumic acid is carried on said adsorbent of microfibrils.

\* \* \* \* \*